(12) United States Patent
Na et al.

(10) Patent No.: US 12,451,288 B2
(45) Date of Patent: Oct. 21, 2025

(54) MULTILAYER ELECTRONIC COMPONENT

(71) Applicant: SAMSUNG ELECTRO-MECHANICS CO., LTD., Suwon-si (KR)

(72) Inventors: Won Jun Na, Suwon-si (KR); Yun Sung Kang, Suwon-si (KR); Sun Hwa Kim, Suwon-si (KR); Byeong Gyu Park, Suwon-si (KR); Hoe Chul Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 146 days.

(21) Appl. No.: 18/127,222

(22) Filed: Mar. 28, 2023

(65) Prior Publication Data

US 2024/0203645 A1 Jun. 20, 2024

(30) Foreign Application Priority Data

Dec. 15, 2022 (KR) .................. 10-2022-0175641

(51) Int. Cl.
*H01G 4/008* (2006.01)
*H01G 4/012* (2006.01)
*H01G 4/12* (2006.01)
*H01G 4/30* (2006.01)

(52) U.S. Cl.
CPC ............ *H01G 4/008* (2013.01); *H01G 4/012* (2013.01); *H01G 4/1227* (2013.01); *H01G 4/1281* (2013.01); *H01G 4/30* (2013.01)

(58) Field of Classification Search
CPC ....... H01G 4/008; H01G 4/012; H01G 4/1227; H01G 4/1281; H01G 4/30; H01G 4/32
See application file for complete search history.

(56) References Cited

U.S. PATENT DOCUMENTS

| 2005/0152095 | A1 | 7/2005 | Nakano et al. | |
|---|---|---|---|---|
| 2009/0067117 | A1* | 3/2009 | Kasuya | H01G 4/30 156/89.18 |
| 2013/0321978 | A1* | 12/2013 | Lee | H01G 4/1227 361/301.4 |
| 2022/0301771 | A1 | 9/2022 | Suemasa | |
| 2023/0084921 | A1* | 3/2023 | Masuda | C04B 35/4682 361/301.4 |
| 2023/0298820 | A1* | 9/2023 | Masuda | H01G 4/012 361/301.4 |
| 2023/0317373 | A1* | 10/2023 | Suemasa | H01G 4/0085 361/301.4 |

FOREIGN PATENT DOCUMENTS

| JP | 2022-143334 A | 10/2022 |
|---|---|---|
| KR | 10-2005-0073531 A | 7/2005 |

* cited by examiner

*Primary Examiner* — Michael P McFadden
(74) *Attorney, Agent, or Firm* — Morgan, Lewis & Bockius LLP

(57) ABSTRACT

A multilayer electronic component includes a body including a dielectric layer and an internal electrode disposed alternately with the dielectric layer, and an external electrode disposed on the body. The internal electrode includes nickel (Ni) and yttrium (Y), and an average thickness of the internal electrode is 50 nm or more to 250 nm or less.

30 Claims, 6 Drawing Sheets

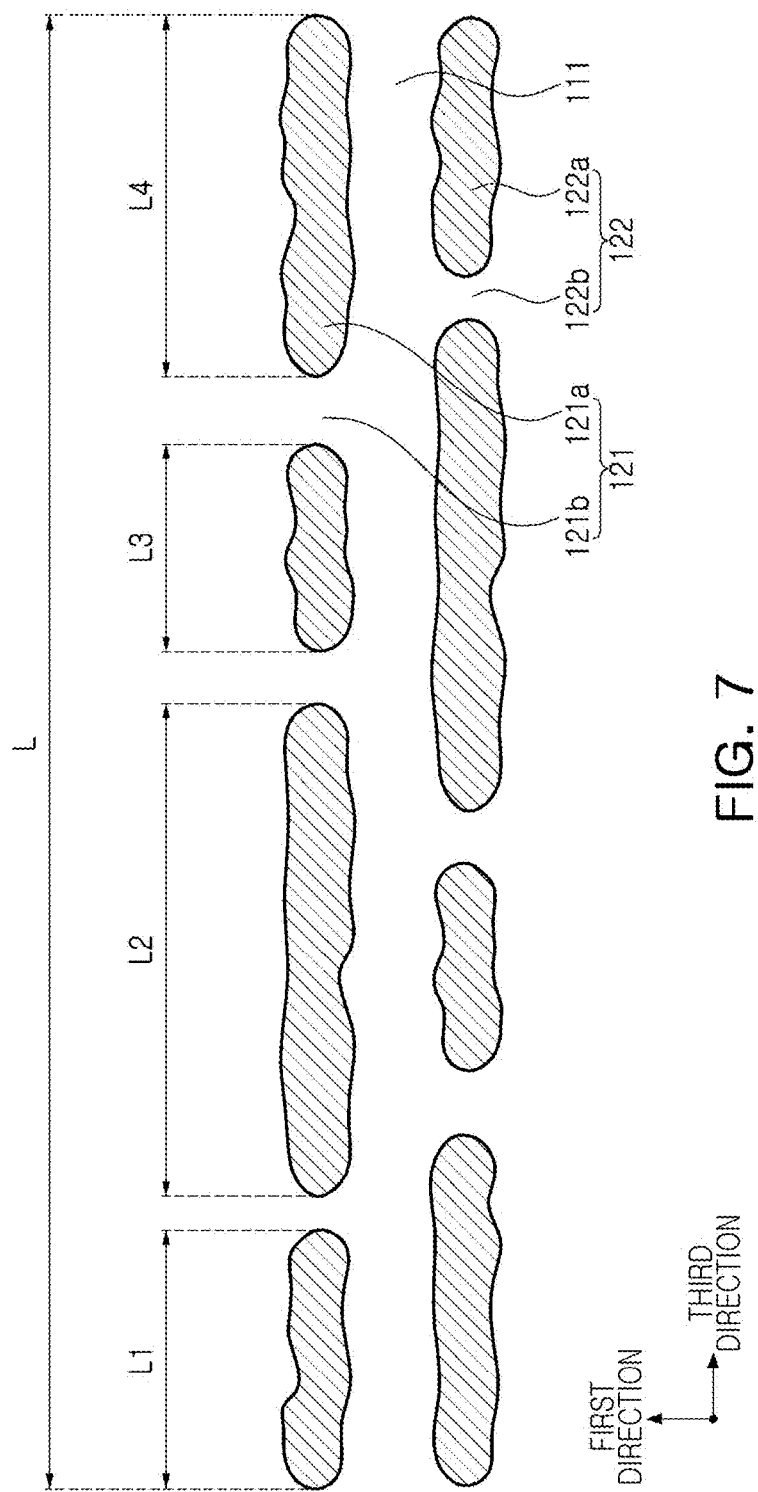

MULTILAYER ELECTRONIC COMPONENT

CROSS-REFERENCE TO RELATED APPLICATION (S)

This application claims benefit of priority to Korean Patent Application No. 10-2022-0175641 filed on Dec. 15, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a type of multilayer electronic component, may be a chip-type capacitor mounted on the printed circuit boards of various electronic products such as imaging devices including liquid crystal displays (LCDs) and plasma display panels (PDPs), computers, smartphones, mobile phones, and the like, serving to charge or discharge electricity therein or therefrom.

As one of methods for miniaturization and implementation of high capacitance of multilayer ceramic capacitors, there is provided a method of thinning internal electrodes. However, when internal electrodes are formed by printing or applying a conductive paste, it may be difficult to ensure uniformity of the thickness of the internal electrodes, and the thickness may vary from position to position. In addition, after the internal electrodes are formed by printing or applying the conductive paste, a disconnected region may be formed in the internal electrodes through a stacking process, a compression process, and a sintering process. Such a disconnected region may cause a step, as a degree at which internal electrodes are staked increases.

Therefore, there is a need to improve an internal electrode structure capable of ensuring connectivity and uniformity while being easily thinned.

SUMMARY

An aspect of the present disclosure is to resolve an issue such as difficulty in ensuring connectivity or thickness uniformity of internal electrodes when the internal electrode is thinned.

Another aspect of the present disclosure is to improve insulation resistance properties and withstand voltage properties of a multilayer electronic component by thinning internal electrodes, ensuring connectivity of the internal electrodes, and reducing a thickness deviation (deviation in thickness) of the internal electrodes.

However, the aspects of the present disclosure are not limited to the above, and will be more easily understood in the process of describing specific example embodiments of the present disclosure.

According to an aspect of the present disclosure, there is provided a multilayer electronic component including a body having a dielectric layer and an internal electrode alternately disposed with the dielectric layer, and an external electrode disposed on the body. The internal electrode may include nickel (Ni) and yttrium (Y). An average thickness of the internal electrode may be 50 nm or more to 250 nm or less.

According to an aspect of the present disclosure, there is s provided a multilayer electronic component including a body including a dielectric layer and an internal electrode disposed alternately with the dielectric layer, and an external electrode disposed on the body. The internal electrode includes nickel (Ni) and yttrium (Y). A content of yttrium (Y) included in the internal electrode is greater than a content of yttrium (Y) included in the dielectric layer.

According to example embodiments of the present disclosure, connectivity or thickness uniformity of internal electrodes may be ensured even when the internal electrodes are thinned.

In addition, a multilayer electronic component may have improved insulation resistance properties and withstand voltage properties by thinning internal electrodes, ensuring connectivity of the internal electrodes, and reducing a thickness deviation of the internal electrodes.

The various and beneficial advantages and effects of the present disclosure are not limited to the above, and will be more easily understood in the course of describing specific example embodiments.

BRIEF DESCRIPTION OF DRAWINGS

The above and other aspects, features, and advantages of the present disclosure will be more clearly understood from the following detailed description, taken conjunction with the accompanying drawings, in which:

FIG. 7 is an enlarged view illustrating an enlarged state of a portion of a capacitance formation portion in a cross-section of a multilayer electronic component in first and third directions according to an example embodiment of the present disclosure.

DETAILED DESCRIPTION

Figure 1:
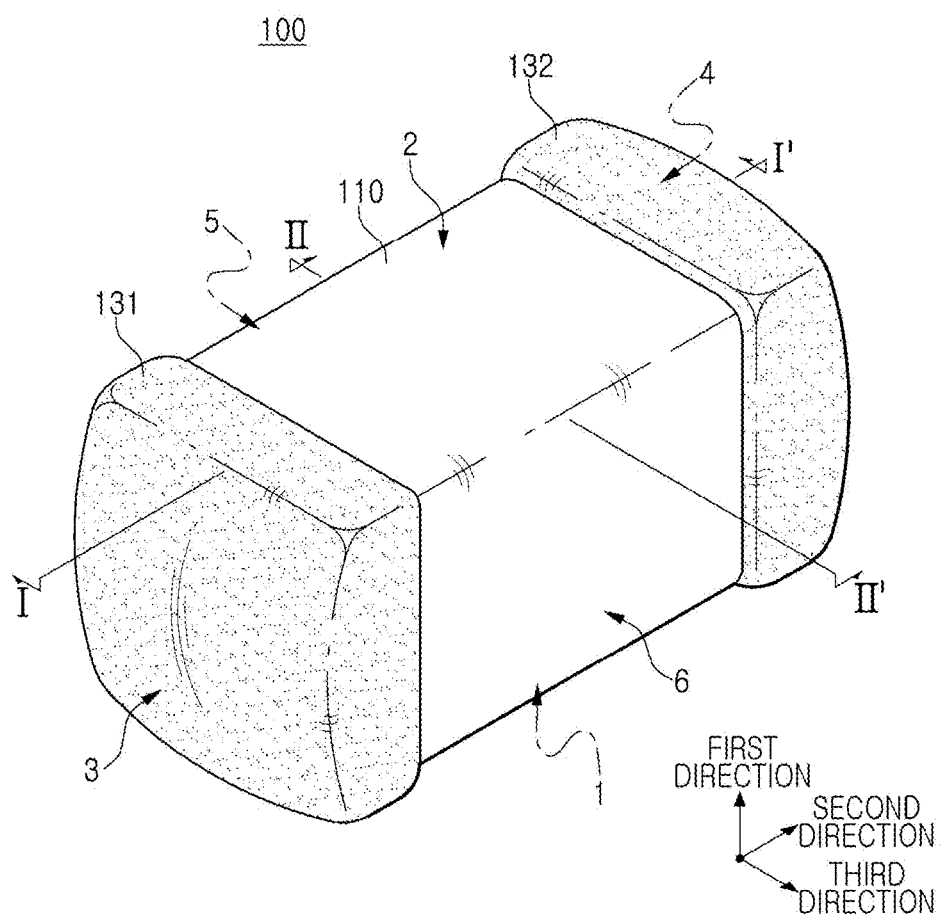
FIG. 1 is a perspective view illustrating a multilayer electronic component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is represented by as "comprising" or "including," it means that it may include other elements as well, rather than excluding other elements, unless specifically stated otherwise.

In the drawings, a first direction may be defined as a direction in which first and second internal electrodes are alternately disposed with a dielectric layer interposed therebetween or a thickness (T) direction. Among a second direction and a third direction, perpendicular to the first direction, the second direction may be defined as a length (L) direction, and the third direction may be defined as a width (W) direction.

FIG. 1 is a perspective view illustrating a multilayer electronic component according to an example embodiment of the present disclosure.

Figure 2:
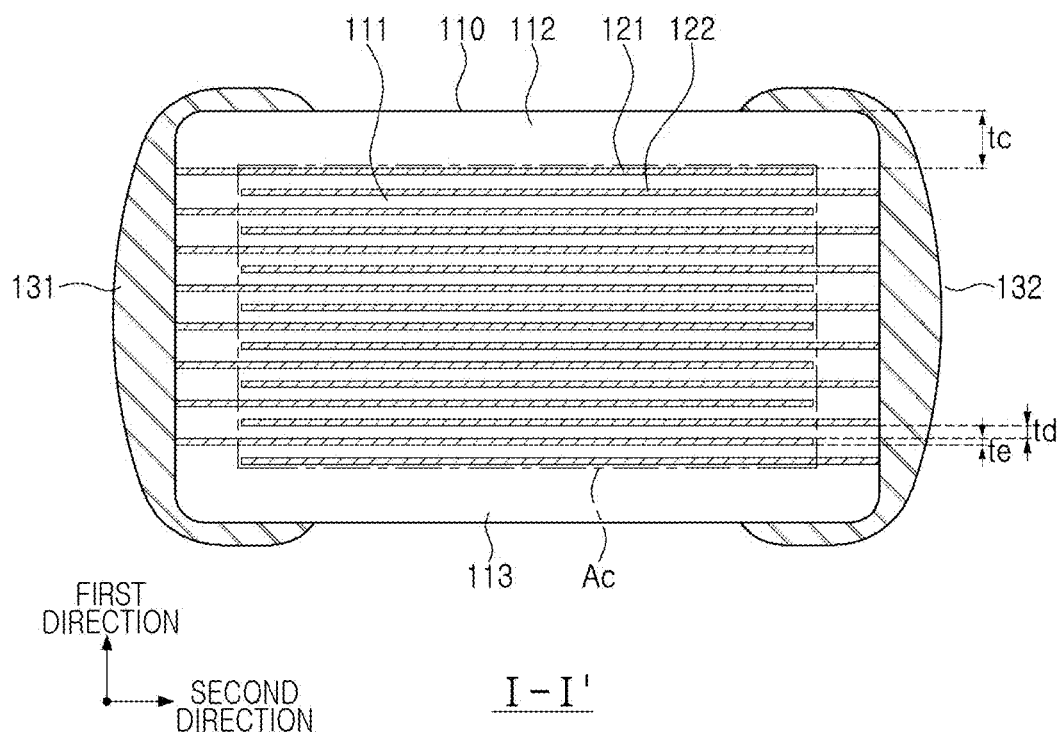
FIG. 2 is a cross-sectional view taken along line I-I' of FIG. 1.

FIG. 2 is a cross-sectional view taken along line I-I' of FIG. 1.

Figure 3:
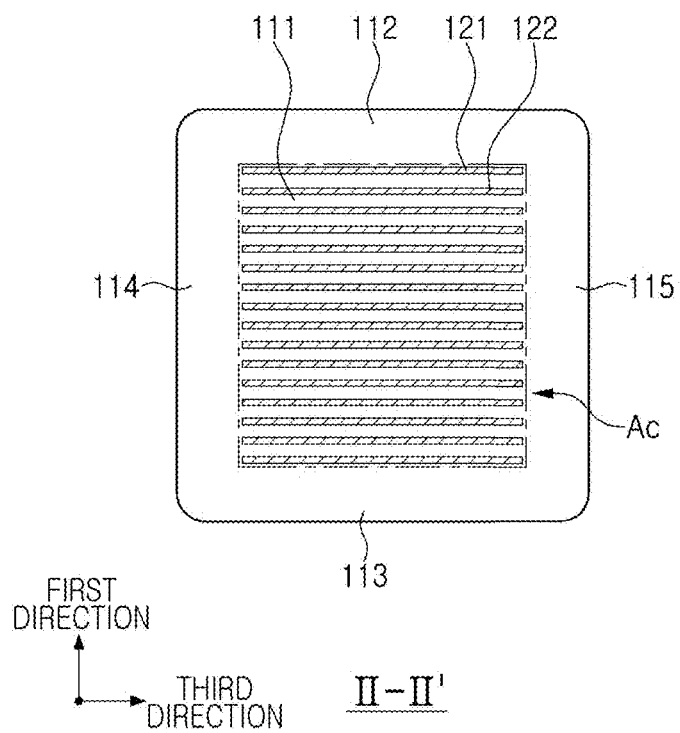
FIG. 3 is a cross-sectional view taken along line II-II' of FIG. 1.

FIG. 3 is a cross-sectional view taken along line II-II' of FIG. 1.

Figure 4:
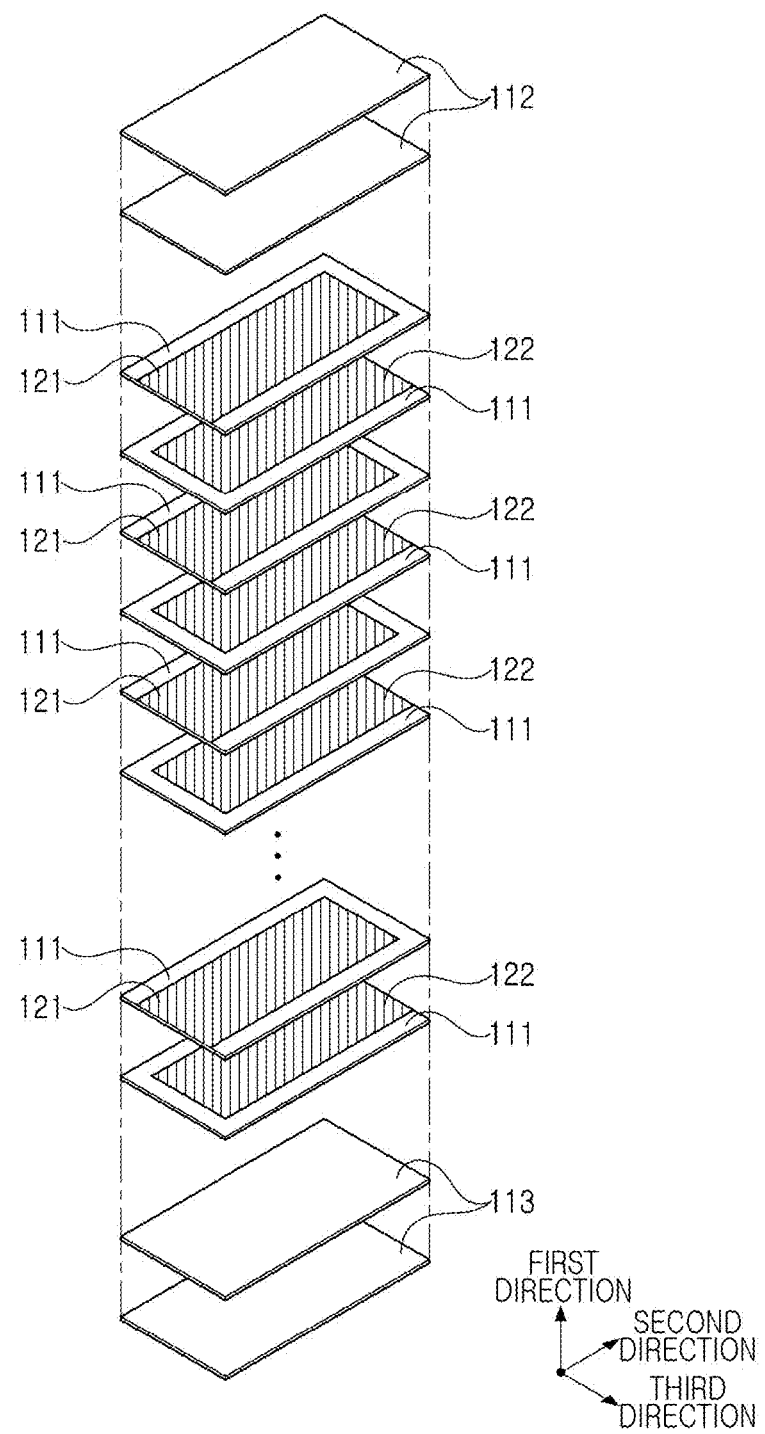
FIG. 4 is an exploded perspective view illustrating an exploded body of a multilayer electronic component according to an example embodiment of the present disclosure.

FIG. 4 is an exploded perspective view illustrating an exploded body of a multilayer electronic component according to an example embodiment of the present disclosure.

Figure 5:
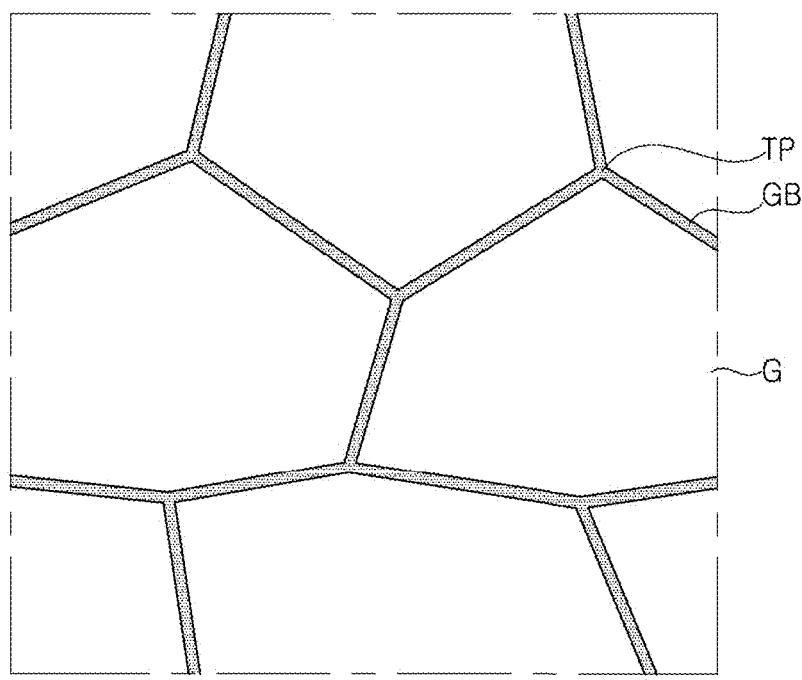
FIG. 5 is a schematic diagram illustrating shapes of a grain and a grain boundary included in an internal electrode according to an example embodiment of the present disclosure.

FIG. 5 is a schematic diagram illustrating shapes of a grain and a grain boundary included in an internal electrode according to an example embodiment of the present disclosure.

Figure 6:
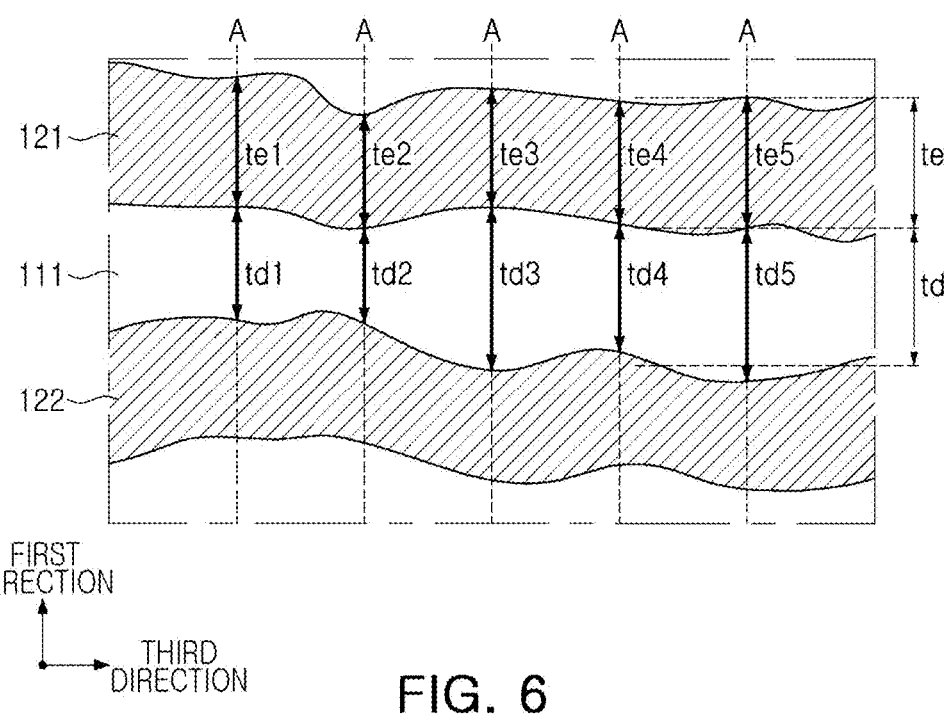
FIG. 6 is an enlarged view illustrating an enlarged state of a portion of a capacitance formation portion in a cross-section of a multilayer electronic component in first and third directions according to an example embodiment of the present disclosure.

FIG. 6 is an enlarged view illustrating an enlarged state of a portion of a capacitance formation portion in a cross-section of a multilayer electronic component in first and third directions according to an example embodiment of the present disclosure.

FIG. 7 is an enlarged view illustrating an enlarged state of a portion of a capacitance formation portion in a cross-section of a multilayer electronic component in first and third directions according to an example embodiment of the present disclosure.

Hereinafter, a multilayer electronic component 100 and various example embodiments according to an example embodiment and various example embodiments of the present disclosure will be described with reference to FIGS. 1 to 7.

The multilayer electronic component 100 may include a body 110 including a dielectric layer 111 and internal electrodes 121 and 122 alternately disposed with the dielectric layer interposed therebetween, and external electrodes 131 and 132 disposed on the body 110. The internal electrodes 121 and 122 may include nickel (Ni) and yttrium (Y), and an average thickness (te) of the internal electrodes 121 and 122 may be 50 nm or more to 250 nm or less.

In the body 110, the dielectric layer 111 and the internal electrodes 121 and 122 may be alternately stacked.

A specific shape of the body 110 is not particularly limited. However, as illustrated, the body 110 may have a hexahedral shape or a shape similar thereto. During a sintering process, ceramic powder included in the body 110 may be shrunken, such that the body 110 may not have a perfectly straight hexahedral shape, but may have a substantially hexahedral shape.

The body 110 may have first and second surfaces 1 and 2 opposing each other in a first direction, third and fourth surfaces connected to the first and second surfaces 1 and 2 and opposing each other in a second direction, and fifth and sixth surfaces 5 and 6 connected to the third to fourth surfaces and opposing each other in a third direction.

A plurality of dielectric layers 111 included in the body 110 may be in a sintered state, and adjacent dielectric layers 111 may be integrated with each other such that boundaries therebetween are not readily apparent without using a scanning electron microscope (SEM).

According to an example embodiment of the present disclosure, a raw material for forming the dielectric layer 111 is not particularly limited as long as sufficient capacitance is obtainable therewith. For example, a barium titanate-based material, a lead composite perovskite-based material, or a strontium titanate-based material may be used. The barium titanate-based material may include $BaTiO_3$-based ceramic powder. Examples of the ceramic powder may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, or $Ba(Ti_{1-y}Zr_y)O_3$ $(0<y<1)$ obtained by partially dissolving Ca or Zr in $BaTiO_3$.

In addition, as a raw material for forming the dielectric layer 111, various ceramic additives, organic solvents, binders, dispersants, and the like may be added to powder such as barium titanate ($BaTiO_3$) depending on the purpose of the present disclosure.

An average thickness (td) of the dielectric layer 111 does not need to be particularly limited. For example, the average thickness (td) of the dielectric layer 111 may be 0.2 μm or more and 2 μm or less.

The average thickness (td) of the dielectric layer 111 may refer to the average thickness (td) of the dielectric layer 111 interposed between the first and second internal electrodes 121 and 122.

The average thickness (td) of the dielectric layer 111 may be measured by scanning a length and a cross-section in a thickness direction (L-T) of the body 110 with the SEM at a magnification of 10,000. More specifically, at thirty points equally spaced from each other in a length direction, a thickness thereof may be measured to measure an average value. The thirty points equally spaced from each other may be designated in a capacitance formation portion Ac. In addition, when a dielectric layer on which such average value measurement is performed is extended to ten dielectric layers, the average thickness of the dielectric layer 111 may be further generalized. Other methods and/or tools appreciated by one of ordinary skill in the art, even if not described in the present disclosure, may also be used.

The body 110 may include a capacitance formation portion Ac disposed therein, the capacitance formation portion Ac having capacitance formed by including the first internal electrode 121 and the second internal electrode 122 alternately disposed with the dielectric layer 111 interposed therebetween, and cover portions 112 and 113 formed on upper and lower portions in a first direction of the capacitance formation portion Ac.

In addition, the capacitance formation portion Ac, a portion contributing to formation of capacitance of a capacitor, may be formed by repeatedly stacking a plurality of first and second internal electrodes 121 and 122 with the dielectric layer 111 interposed therebetween.

In an example embodiment, an upper cover portion 112 may be disposed on one surface in a first direction of the capacitance cover portion Ac, and a lower cover portion 113 may be disposed on the other surface in a first direction of the capacitance cover portion Ac.

The upper cover portion 112 and the lower cover portion 113 may be formed by stacking a single dielectric layer or two or more dielectric layers on upper and lower surfaces in a thickness direction of the capacitance formation portion Ac, respectively, and may basically serve to prevent damage to an internal electrode caused by physical or chemical stress.

The upper cover portion 112 and the lower cover portion 113 may not include an internal electrode, and may include a material the same as that of the dielectric layer 111.

That is, the upper cover portion 112 and the lower cover portion 113 may include a ceramic material, for example, a barium titanate ($BaTiO_3$)-based ceramic material.

An average thickness (tc) of the cover portions 112 and 113 does not need to be particularly limited. However, the average thickness (tc) of the cover portions 112 and 113 may be 15 µm or less in order to more easily achieve miniaturization and implementation of high capacitance of a multilayer electronic component.

The average thickness (tc) of the cover portions 112 and 113 may refer to a size in a first direction, and may be an average value of sizes in a first direction of the cover portions 112 and 113, measured at five equally spaced points of the upper portion or lower portion of the capacitance formation portion Ac.

In an example embodiment, margin portions 114 and 115 may be disposed on one surface and the other surface in a third direction of the capacitance formation portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on opposite end surfaces in a third direction (width direction) of the body 110.

As illustrated in FIG. 3, the margin portions 114 and 115 may refer to regions between opposite ends of the first and second internal electrodes 121 and 122 and an interface of the body 110 in a cross-section of the body 110 cut in a width-thickness (W-T) direction.

The margin portions 114 and 115 may basically serve to prevent damage to an internal electrode due to physical or chemical stress.

The margin portions 114 and 115 may be formed by forming an internal electrode by applying a conductive paste onto a ceramic green sheet, except a portion in which a margin portion is to be formed.

In addition, in order to suppress a step caused by the internal electrodes 121 and 122, internal electrodes 121 and 122 may be stacked, and then may be cut to be exposed toward the fifth and sixth surfaces 5 and 6 of the body 110. Thereafter, a single dielectric layer or two or more dielectric layers may be stacked on opposite side surfaces of the capacitance formation portion Ac in a third direction (width direction) to form the margin portions 114 and 115.

A width of each of the margin portions 114 and 115 does not need to be particularly limited. However, an average width of the margin portions 114 and 115 may be 15 µm or less in order to more easily achieve miniaturization and implementation of high capacitance of a multilayer electronic component.

The average width of the marginal portions 114 and 115 may refer to an average value of sizes in a third direction of the marginal portions 114 and 115, measured at five equally spaced points of a side surface of the capacitance formation portion Ac.

The internal electrodes 121 and 122 may be alternately disposed with the dielectric layer 111 in a first direction.

The internal electrodes 121 and 122 may include first and second internal electrodes 121 and 122. The first and second internal electrodes 121 and 122 may be alternately disposed to oppose each other with the dielectric layer 111 included in the body 110 interposed therebetween, and may be connected to the third and fourth surfaces 3 and 4 of the body 110, respectively. Specifically, one end of the first internal electrode 121 may be connected to the third surface 3, and one end of the second internal electrode 122 may be connected to the fourth surface 4. That is, in an example embodiment, the internal electrodes 121 and 122 may be in contact with the third surface 3 or the fourth surface 4.

The first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body 110 to be connected to the first internal electrode 121, and a second external electrode 132 may be disposed on the fourth surface 4 of the body 110 to be connected to the second internal electrode 122.

That is, the first internal electrode 121 may be connected to the first external electrode 131 without being connected to the second external electrode 132, and the second internal electrode 122 may be connected to the second external electrode 132 without being connected the first external electrode 131. Accordingly, the first internal electrode 121 may be formed to be spaced apart from the fourth surface 4 by a predetermined distance, and the second internal electrode 122 may be formed to be spaced apart from the third surface 3 by a predetermined distance. In this case, the first and second internal electrodes 121 and 122 may be electrically isolated from each other by the dielectric layer 111 interposed therebetween.

According to an example embodiment of the present disclosure, an average thickness (te) of the internal electrodes 121 and 122 may be 50 nm or more and 250 nm and less. Accordingly, the internal electrodes 121 and 122 may be thinned, thereby easily achieving miniaturization and implementation of high capacitance of the multilayer electronic component 100. A method of adjusting the average thickness (te) of the internal electrodes 121 and 122 to 50 nm or more to 250 nm or less is not particularly limited. However, when the internal electrodes 121 and 122 are formed by printing or applying a conductive paste, and then performing sintering, it may be difficult to ensure connectivity and thickness uniformity of the internal electrodes 121 and 122. In an example embodiment, the internal electrodes 121 and 122 may be formed by a thin film deposition method such as a sputtering method, a vacuum deposition method, and a chemical vapor deposition method, thereby improving connectivity and thickness uniformity of the internal electrodes 121 and 122.

When a conductive paste is applied to or printed on the body 110 or the internal electrodes 121 and 122 are formed by the thin film deposition method, a sintering process may be performed together with the dielectric layer 111. In order to simultaneously sinter the dielectric layer 111 and the internal electrodes 121 and 122, when sintering is performed at a temperature of 1000° C. or higher, sintering may be first performed on nickel (Ni) included in the internal electrodes 121 and 122 at 1000° C. lower than a sintering temperature of a barium titanate-based material included in the dielectric layer 111, and accordingly local agglomeration and disconnection may occur. In the related art, a method of limiting physical contact between nickel (Ni) particles by adding ceramic particles including barium titanate as a co-material may be used to suppress over-sintering of nickel (Ni) of the internal electrodes 121 and 122. However, as the sintering process is performed, barium titanate may be easily diffused into the dielectric layer 111, resulting in a limitation on the effect of delaying the sintering of the internal electrodes 121 and 122 at an early stage of sintering.

According to an example embodiment of the present disclosure, the internal electrodes 121 and 122 may include nickel (Ni) and yttrium (Y). Yttrium (Y) may be included in the internal electrodes 121 and 122 together with nickel (Ni) to delay sintering of nickel (Ni) particles. In addition, yttrium (Y) included in the internal electrodes 121 and 122 may not be diffused into or transferred to the dielectric layer 111 during the sintering process, and may have a melting point higher than that of the barium titanate-based material included in the dielectric layer 111, such that yttrium (Y) may be present in the internal electrodes 121 and 122 until the sintering process is completed. Accordingly, the effect of delaying the sintering of nickel (Ni) may continue.

Accordingly, as in an example embodiment of the present disclosure, when the internal electrodes 121 and 122 include nickel (Ni) and yttrium (Y) and an average thickness (td) of the internal electrodes 121 and 122 is 50 nm or more to 250 nm or less, the internal electrodes 121 and 122 may be thinned, and yttrium (Y) included in the internal electrodes 121 and 122 may delay sintering of nickel (Ni) particles until the sintering process is completed, thereby improving connectivity of the internal electrodes 121 and 122, and reducing a thickness deviation of the internal electrodes 121 and 122. Accordingly, the multilayer electronic component 100 may have improved withstand voltage properties and insulation resistance properties.

In an example embodiment, the internal electrodes 121 and 122 may include at least one of an oxide including yttrium (Y) and a nickel (Ni)-yttrium (Y) alloy. Accordingly, diffusion or transfer of yttrium (Y), included in the internal electrodes 121 and 122, to the dielectric layer 111 may be further suppressed, thereby further improving the effect of delaying the sintering of nickel (Ni).

A content of yttrium (Y) included in the internal electrodes 121 and 121 is not particularly limited. However, in order to sufficiently delay sintering of nickel (Ni), the internal electrodes 121 and 122 may include yttrium (Y) having a content of 0.5 wt % or more and 20 wt % or less relative to a content of nickel (Ni).

In an example embodiment, the internal electrodes 121 and 122 may be formed by simultaneously depositing nickel (Ni) and yttrium (Y). Accordingly, not only the content of yttrium (Y) included in the internal electrodes 121 and 122 may be easily adjusted, but also yttrium (Y) included in the internal electrodes 121 and 122 may be adjusted to be evenly distributed before sintering of the internal electrodes 121 and 122, thereby efficiently controlling a grain growth of the nickel (Ni) particles included in the entire internal electrodes 121 and 122.

As described above, when yttrium (Y) included in the internal electrodes 121 and 122 is diffused into or transferred to the dielectric layer 111 during the sintering process, it may be difficult to maintain sintering of the nickel (Ni) particles included in the internal electrodes 121 and 122 until the sintering process is completed, and accordingly, it may be difficult to sufficiently suppress over-sintering of the nickel (Ni) particles. In an example embodiment, the dielectric layer 111 may be adjusted to substantially not include yttrium (Y), such that the effect of suppressing the over-sintering of the nickel (Ni) particles may be more remarkable.

In this case, "to substantially not include yttrium (Y)" may refer to a case in which yttrium (Y) having a content of 0.05 at % or less is included relative to a content of a main component or all components of the dielectric layer 111, that is, may refer to a degree measured as a noise level when elements included in the dielectric layer 111 are measured by an elemental analysis method such as scanning electron microscope-energy dispersive X-ray spectroscopy (SEM-EDS) or transmission electron microscope-energy dispersive X-ray spectroscopy (TEM-EDS). Other methods and/or tools appreciated by one of ordinary skill in the art, even if not described in the present disclosure, may also be used.

The dielectric layer 111 may include an extremely small amount of yttrium (Y), and the content of yttrium (Y) included in the internal electrodes 121 and 122 may be greater than a content of yttrium (Y) included in the dielectric layer 111. The content of yttrium (Y) included in the internal electrodes 121 and 122 may be preferably two times to three times or more than the content of yttrium (Y) included in the dielectric layer 111.

A method of measuring types and contents of elements included in the dielectric layer 111, the internal electrodes 121 and 122, and/or the grains and grain boundary is not particularly limited. As an example, the types and contents may be calculated from an image observed using SEM-EDS. Specifically, the multilayer electronic component 100 may be polished up to a central portion thereof in a second direction to expose a cross-section thereof in first and third directions. Thereafter, in a central region among regions obtained by dividing the capacitance formation portion Ac into five portions in a first direction, types and contents (wt %, at %, and mol %) of respective elements included in the dielectric layer 111 and the internal electrodes 121 and 122 may be measured using SEM-EDS. For example, the content of yttrium (Y) in the internal electrodes 121 and 122, grains, and grain boundary may be relative to the content of nickel (Ni). Other methods and/or tools appreciated by one of ordinary skill in the art, even if not described in the present disclosure, may also be used.

Referring to FIG. 5, in an example embodiment, the internal electrodes 121 and 122 may include a plurality of grains G and a grain boundary GB disposed between the plurality of grains G.

In an example embodiment, yttrium (Y) included in the internal electrodes 121 and 122 may be disposed in the grain boundary GB. However, yttrium (Y) disposed in the grain boundary GB does not mean that yttrium (Y) may also be included in the grain G.

That is, in an example embodiment, the grain G and the grain boundary GB may include yttrium (Y). In this case, a content of yttrium (Y) included in the grain boundary GB may be twice or more than a content of yttrium (Y) included in the grain G, thereby further improving the effect of suppressing a grain growth of the grain G. In an example embodiment, yttrium (Y) may be included in a triple point (TP) at which three grains are disposed to be in contact with each other, thereby further improving the effect of suppressing a grain growth of the grain G. The grain boundary GB may be observed using SEM or TEM. Other methods and/or tools appreciated by one of ordinary skill in the art, even if not described in the present disclosure, may also be used.

The external electrodes 131 and 132 may be disposed on the body 110. The external electrodes 131 and 132 may include first and second external electrodes 131 and 132 respectively disposed on the third and fourth surfaces 3 and 4 of the body 110 to be respectively connected to the first and second internal electrodes 121 and 122.

In the present example embodiment, a structure in which the multilayer electronic component 100 has two external electrodes 131 and 132 is described, but the number and shapes of the external electrodes 131 and 132 may be changed depending on shapes of the internal electrodes 121 and 122, or other purposes.

The external electrodes 131 and 132 may be formed using any material as long as it has electrical conductivity, such as metal, and a specific material may be determined in consideration of electrical properties, structural stability, and the like. Furthermore, the external electrodes 131 and 132 may have a multilayer structure.

For example, the external electrodes 131 and 132 may include an electrode layer disposed on the body 110 and plating layers 131b and 132b disposed on the electrode layer.

As a more specific example of the electrode layer, the electrode layer may be a sintered electrode including a conductive metal and glass, or a resin-based electrode including a conductive metal and resin.

In addition, the electrode layer may have a form in which the sintered electrode and the resin-based electrode are sequentially formed on the body 110. In addition, the electrode layer may be formed by transferring a sheet including a conductive metal onto the body 110 or by transferring a sheet including a conductive metal onto the sintered electrode.

As the conductive metal included in the electrode layer, a material having excellent electrical conductivity may be used and is not particularly limited. For example, the conductive metal may be at least one of nickel (Ni), copper (Cu), and an alloy thereof, and may be preferably copper (Cu) to improve adhesion to the body 110.

The plating layer may serve to improve mounting properties. A type of the plating layer is not particularly limited, and may be a plating layer including at least one of nickel (Ni), tin (Sn), palladium (Pd), and alloys thereof, and may be formed as a plurality of layers.

For a more specific example of the plating layer, the plating layer may be a Ni plating layer or a Sn plating layer, may have a form in which a Ni plating layer and a Sn plating layer are sequentially formed on the electrode layer, and may have a form in which a Sn plating layer, a Ni plating layer, and a Sn plating layer are sequentially formed. In addition, the plating layer may include a plurality of Ni plating layers and/or a plurality of Sn plating layers.

Hereinafter, an example of the meaning and measurement method of an average thickness of an internal electrode, an average thickness of a dielectric layer, a thickness deviation of an internal electrode, and a thickness deviation of a dielectric layer in the present disclosure will be described with reference to FIG. 6.

FIG. 6 is an enlarged view of a portion of a capacitance formation portion in a cross-section of the multilayer electronic component 100 in first and third directions, and more specifically, FIG. 6 is an enlarged view of a portion of any internal electrodes 121 and 122 and dielectric layer 111 included in a central region among regions obtained by dividing the capacitance formation portion A into five portions in a cross-section of the multilayer electronic component 100 in first and third directions obtained by cutting a central portion in a second direction of the multilayer electronic component 100.

An average thickness (te) of an internal electrode may be an average value of sizes (te1, te2, te3, te4, te5, . . . ) in a first direction of the first internal electrode 121 measured at five equally spaced points (line A) in a third direction in the region of FIG. 6. When the internal electrode on which such average value measurement is performed is extended to ten internal electrodes or more or is extended to include the second internal electrode 122, the average thickness (te) of the internal electrodes may be more generalized.

An average thickness (td) of a dielectric layer may be an average value of sizes (td1, td2, td3, td4, td5, . . . ) in a first direction of the dielectric layer 111 measured at five or more equally spaced points (line A) in a third direction in the region of FIG. 6. When the dielectric layer on which such average value measurement is performed is extended to 10 or more dielectric layers, the average thickness (td) of the dielectric layer may be further generalized.

A thickness deviation of an internal electrode may refer to a coefficient of variation (CV) obtained by summing values obtained by squaring differences between sizes (te1, te2, te3, te4, te5, . . . ) in a first direction of the first internal electrode 121 measured at five or more equally spaced points (line A) in a third direction and the average thickness (te) of the internal electrode measured by the above-described method, dividing a value obtained by summation by the number of positions in which measurement is performed, taking a square root of a value obtained by division to obtain a standard deviation value, and then dividing the standard deviation value by the average thickness (te) of the internal electrode.

A thickness deviation of a dielectric layer may refer to a coefficient of variation (CV) obtained by summing values obtained by squaring differences between sizes (td1, td2, td3, td4, td5, . . . ) in a first direction of the dielectric layer 111 measured at five or more equally spaced points (line A) in a third direction and the average thickness (td) of the dielectric layer measured by the above-described method, dividing a value obtained by summation by the number of positions in which measurement is performed, taking a square root of a value obtained by division to obtain a standard deviation value, and then dividing the standard deviation value by the average thickness (td) of the dielectric layer.

The average thickness (te) of the internal electrode, the average thickness (td) of the dielectric layer, the thickness deviation of the internal electrode, and the thickness deviation of the dielectric layer may be measured from an image observed at a magnification of 10,000 times or more with the SEM. Other methods and/or tools appreciated by one of ordinary skill in the art, even if not described in the present disclosure, may also be used.

In an example embodiment, the average thickness (te) of the internal electrode may be less than the average thickness (td) of the dielectric layer. Accordingly, the average thickness (te) of the internal electrode may be thinned to easily achieve miniaturization and implementation of high capacitance of the multilayer electronic component 100, and the dielectric layer may be formed to have a sufficient thickness further to improve insulation resistance properties and withstand voltage properties. In particular, in an example embodiment of the present disclosure, the internal electrodes 121 and 122 may include nickel (Ni) and yttrium (Y), and thus the internal electrodes 121 and 122 may be further thinned, such that the effect of improving insulation resistance properties and withstand voltage properties may be more remarkable.

FIG. 7 is an enlarged view illustrating an enlarged state of a portion of a capacitance formation portion in a cross-section of a multilayer electronic component in first and third directions according to an example embodiment of the present disclosure.

According to an example embodiment of the present disclosure, when the internal electrodes 121 and 122 include nickel (Ni) and yttrium (Y), connectivity of the internal electrodes 121 and 122 may be improved even when the average thickness (te) of the internal electrodes 121 and 122 is 250 nm or less. In an example embodiment, the internal electrodes 121 and 122 include two or more electrode regions 121a and 122a including a conductive material, and disconnected regions 121b and 122b, spaces between the electrode regions 121a and 122a. When a ratio of a sum (L1+L2+L3+L4 . . . ) of lengths of electrode regions relative to a total length (L) of the internal electrodes 121 and 122 is referred to as electrode connectivity, the electrode connectivity may be preferably 90% or more. The total length (L) of the internal electrodes may refer to a size in a third direction including the electrode regions 121a and 122a and the disconnected regions 121b and 122b in any layer of the internal electrodes 121 and 122. Lengths (L1, L2, L3, L4, . . . ) of the electrode regions may refer to sizes in a third direction of the electrode regions 121a and 122a excluding the disconnected regions 121b and 122b. The electrode connectivity may be further generalized by extending to 10 or more internal electrodes 121 and 122. The electrode regions 121a and 122a and the disconnected regions 121b and 122b may be distinguished by a contrast difference in an image observed at a magnification of 10,000 times or more with the SEM, and the contrast difference may be made clearer through an image program. Other methods and/or tools appreciated by one of ordinary skill in the art, even if not described in the present disclosure, may also be used.

A size of the multilayer electronic component 100 does not need to be particularly limited.

However, in order to achieve miniaturization and implementation of high capacitance at the same time, a thickness of each of a dielectric layer and an internal electrode may need to be reduced to increase the number of layers. Thus, the multilayer electronic component 100 having a size of 0603 (length×width: 0.6 mm×0.3 mm) or less may be applicable to the present disclosure.

Here, a length of the multilayer electronic component 100 may refer to a maximum size in a second direction of the multilayer electronic component 100, and a width of the multilayer electronic component 100 may refer to a maximum size in a third direction of the multilayer electronic component 100.

Examples

In Comparative Example, a sample of a multilayer electronic component was manufactured under conditions the same as those in the Example, except that yttrium (Y) was not added and a conductive paste including nickel (Ni) was applied.

In the Example, a Ni internal electrode including Y having a content of 2.57 wt % was deposited to a thickness of 150 nm through simultaneous deposition of Ni and Y on a dielectric sheet having a thickness of 1.0 µm. A sample bar was manufactured by stacking the deposited printing sheets, and the manufactured sample bar was manufactured as a sample of a multilayer electronic component through a cutting and plasticizing/sintering process. The process was performed at sintering temperatures of 1190° ° C., 1200° ° C., and 1210° ° C. in a hydrogen atmosphere of 0.11%.

Figure 8A:
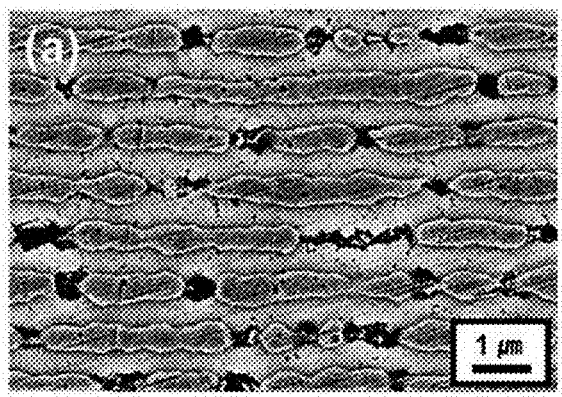
FIGS. 8A and 8B are each a scanning electron microscope (SEM) image illustrating a shape of an internal electrode according to Comparative Example and Example, respectively.
Figure 8B:
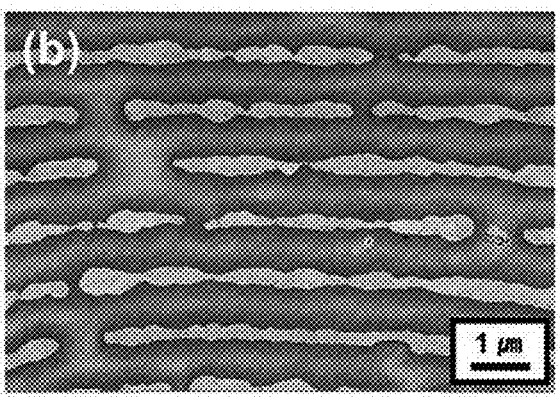

FIGS. 8A and 8B are each a scanning electron microscope (SEM) image illustrating a shape of an internal electrode according to Comparative Example and Example, respectively.

As a result of measuring an image according to FIGS. 8A and 8B using an image program and the above-described method of measuring an average thickness of internal electrodes and connectivity of the internal electrodes, Comparative Example (FIG. 8A) showed that an average thickness of internal electrodes after sintering was 450±65 nm, and connectivity of the internal electrodes was 86%, and Example (FIG. 8B) showed that an average thickness of internal electrodes after sintering was 25673 nm, and connectivity of the internal electrodes was 96%.

While example embodiments have been shown and described above, it will be apparent to those skilled in the art that modifications and variations could be made without departing from the scope of the present disclosure, as defined by the appended claims.

What is claimed is:

1. A multilayer electronic component comprising:
a body including a dielectric layer and an internal electrode disposed alternately with the dielectric layer; and
an external electrode disposed on the body,
wherein the internal electrode includes nickel (Ni) and yttrium (Y),
the internal electrode includes a plurality of grains and a grain boundary disposed between the plurality of grains, and wherein yttrium (Y) is included in at least one of the plurality of grains that include nickel (Ni).

2. The multilayer electronic component of claim 1, wherein yttrium (Y) is disposed in the grain boundary.

3. The multilayer electronic component of claim 1, wherein
the grain boundary includes yttrium (Y), and
a content of yttrium (Y) included in the grain boundary is twice or more than a content of yttrium (Y) included in the at least one of the plurality of grains.

4. The multilayer electronic component of claim 1, wherein yttrium (Y) is included in a triple point at which three of the plurality of grains are disposed to be in contact with each other.

5. The multilayer electronic component of claim 1, wherein the internal electrode includes at least one of an oxide including yttrium (Y) and a nickel (Ni)-yttrium (Y) alloy.

6. The multilayer electronic component of claim 1, wherein the internal electrode includes yttrium (Y) at a content of 0.5 wt % or more and 20 wt % or less relative to a content of nickel (Ni).

7. The multilayer electronic component of claim 1, wherein the dielectric layer does not substantially include yttrium (Y).

8. The multilayer electronic component of claim 1, wherein
the dielectric layer includes yttrium (Y), and
a content of yttrium (Y) included in the internal electrode is greater than a content of yttrium (Y) included in the dielectric layer.

9. The multilayer electronic component of claim 8, wherein the content of yttrium (Y) included in the internal electrode is two times to three times or more than the content of yttrium (Y) included in the dielectric layer.

10. The multilayer electronic component of claim 1, wherein a deviation of a thickness of the internal electrode is 15% or less.

11. The multilayer electronic component of claim 1, wherein:
the internal electrode includes:
two or more electrode regions including a conductive material, and
a disconnected region, a space between the two or more electrode regions, and an electrode connectivity, which is a ratio of a sum of lengths of the two or more electrode regions relative to a total length of the internal electrode, is 90% or more.

12. The multilayer electronic component of claim 1, wherein an average thickness of the internal electrode is less than an average thickness of the dielectric layer.

13. The multilayer electronic component of claim 1, wherein the internal electrode is formed by simultaneously depositing nickel (Ni) and yttrium (Y).

14. A multilayer electronic component comprising:
a body including a dielectric layer and an internal electrode disposed alternately with the dielectric layer; and
an external electrode disposed on the body,
wherein the internal electrode includes nickel (Ni) and yttrium (Y), and
a content of yttrium (Y) included in the internal electrode is greater than a content of yttrium (Y) included in the dielectric layer, and
the internal electrode includes a plurality of grains and a grain boundary disposed between the plurality of grains, and wherein yttrium (Y) is included in at least one of the plurality of grains that include nickel (Ni).

15. The multilayer electronic component of claim 14, wherein the content of yttrium (Y included in the internal electrode is two times to three times or more than the content of yttrium (Y) included in the dielectric layer.

16. The multilayer electronic component of claim 14, wherein yttrium (Y) is disposed in the grain boundary.

17. The multilayer electronic component of claim 14, wherein an average thickness of the internal electrode is 50 nm or more to 250 nm or less.

18. A multilayer electronic component comprising:
a body including a dielectric layer and an internal electrode disposed alternately with the dielectric layer; and
an external electrode disposed on the body,
wherein the internal electrode includes nickel (Ni) and yttrium (Y), and
the internal electrode includes a plurality of grains and a grain boundary disposed between the plurality of grains and the grain boundary includes yttrium (Y),
wherein at least one of the plurality of grains includes yttrium (Y), and
a content of yttrium (Y) included in the grain boundary is twice or more than a content of yttrium (Y) included in the at least one of the plurality of grains.

19. The multilayer electronic component of claim 18, wherein yttrium (Y) is included in a triple point at which three of the plurality of grains are disposed to be in contact with each other.

20. The multilayer electronic component of claim 18, wherein the internal electrode includes at least one of an oxide including yttrium (Y) and a nickel (Ni)-yttrium (Y) alloy.

21. The multilayer electronic component of claim 18, wherein the internal electrode includes yttrium (Y) at a content of 0.5 wt % or more and 20 wt % or less relative to a content of nickel (Ni).

22. The multilayer electronic component of claim 18, wherein the dielectric layer does not substantially include yttrium (Y).

23. The multilayer electronic component of claim 18, wherein
the dielectric layer includes yttrium (Y), and
a content of yttrium (Y) included in the internal electrode is greater than a content of yttrium (Y) included in the dielectric layer.

24. The multilayer electronic component of claim 22, wherein the content of yttrium (Y) included in the internal electrode is two times to three times or more than the content of yttrium (Y) included in the dielectric layer.

25. The multilayer electronic component of claim 18, wherein a deviation of a thickness of the internal electrode is 15% or less.

26. The multilayer electronic component of claim 18, wherein:
the internal electrode includes:
two or more electrode regions including a conductive material, and
a disconnected region, a space between the two or more electrode regions, and
an electrode connectivity, which is a ratio of a sum of lengths of the two or more electrode regions relative to a total length of the internal electrode, is 90% or more.

27. The multilayer electronic component of claim 18, wherein an average thickness of the internal electrode is less than an average thickness of the dielectric layer.

28. The multilayer electronic component of claim 18, wherein the internal electrode is formed by simultaneously depositing nickel (Ni) and yttrium (Y).

29. A multilayer electronic component comprising:
a body including a dielectric layer and an internal electrode disposed alternately with the dielectric layer; and
an external electrode disposed on the body,
wherein the internal electrode includes nickel (Ni) and yttrium (Y), and
a content of yttrium (Y) included in the internal electrode is greater than a content of yttrium (Y) included in the dielectric layer, and
the internal electrode includes a plurality of grains and a grain boundary disposed between the plurality of grains and the grain boundary includes yttrium (Y),
wherein the content of yttrium (Y) included in the internal electrode is two times to three times or more than the content of yttrium (Y) included in the dielectric layer.

30. The multilayer electronic component of claim 29, wherein an average thickness of the internal electrode is 50 nm or more to 250 nm or less.

* * * * *